Sept. 19, 1933.  C. R. MILLER  1,927,646
GEAR SHIFT LEVER
Filed Jan. 23, 1931
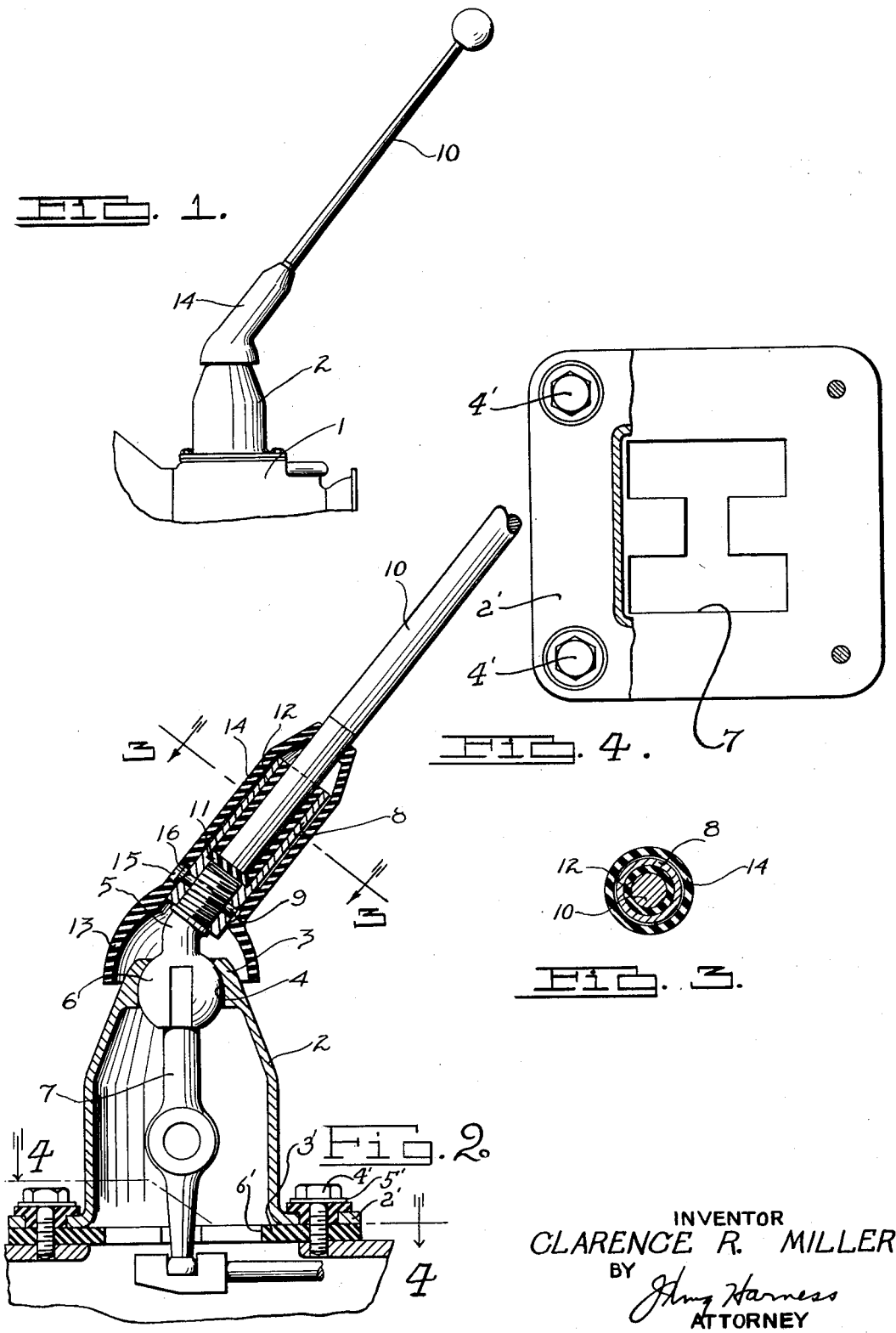
INVENTOR
CLARENCE R. MILLER.
BY
*Jhny Harness*
ATTORNEY Patented Sept. 19, 1933

1,927,646

UNITED STATES PATENT OFFICE 1,927,646

GEAR SHIFT LEVER

Clarence R. Miller, St. Clair Shores, Mich., assignor to Chrysler Corporation, Detroit, Mich., a corporation of Delaware Application January 23, 1931. Serial No. 510,685

6 Claims. (Cl. 74—39)

The main objects of the invention are to provide an improved gear shift lever for a vehicle transmission; to provide means on a lever of this kind for preventing the conduction of sound impulses from the transmission gears to the main length of the gear shift lever which is located in the passenger compartment of a vehicle; to provide metal sections in a gear shift lever which are rigidly secured together, but completely insulated against metal to metal contact; and to provide a sound insulating connecting medium between the sections of the lever which is particularly adapted to form a rigid connection therebetween without excessively enhancing the cost of construction of such articles.

Further objects of the invention are to provide a shield for the conventional universal joint by which vehicle gear shift levers are mounted which is also formed of sound insulating material; and to provide a shield of this kind which is adapted to closely fit around the support of the joint without producing metal to metal contact between the lever and its support and between the sections of which the lever is formed.

An illustrative embodiment of the invention is shown in the accompanying drawing, in which:

Fig. 1 is a fragmentary side view of a vehicle transmission showing a gear shift lever and mounting embodying the invention in elevation.

Fig. 2 is a central vertical section of the gear shift lever and its mounting.

Fig. 3 is a transverse section taken on the line 3—3 of Fig. 2.

Fig. 4 is a transverse section taken on the line 4—4 of Fig. 2.

In the form shown, my improved gear shift lever is illustrated in conjunction with a vehicle transmission having a housing 1 of conventional construction on which a hollow, dome-shape support 2 is provided. In practice, this dome-shape support extends through an opening in the floor of a vehicle body into the passenger compartment thereof.

The support 2 has an outwardly extending flange 2' which is insulated from the top wall of the transmission casing by a sheet of sound insulating material, such as rubber, and the support is firmly clamped on the casing 2 by tap bolts 4' which extend through flanged bushings 5' also formed of sound insulating material such as rubber. The rubber composition used for these purposes has oil resisting properties. The sheet 3' extends completely across an opening 6' in the transmission casing which registers with the interior of the dome-shaped support 2 and it is provided with an H-shaped slot 7'. The rubber elements 3' and 5' prevent metal to metal contact between the dome-shaped support and the transmission casing and obviate the transmission of sound impulses through the support to the interior of the vehicle body.

Formed at the upper end of the support 2 is a socket 3 having a concaved seat 4. A lower gear shift lever section 5 having an enlarged ball shaped intermediate portion 6 and a depending arm 7 is swiveled on the support 2. The ball-shape intermediate portion 6 of the lower gear shift lever section is received in the socket 3 of the support and the upper end portion of this section extends outwardly through the open extremity of the support 2.

Threaded on the external end of the lower gear shift lever section 5 is a metal tube 8 which is secured against displacement by a rivet 9 extending diametrically through the tube. An upper gear shift lever section or rod 10 extends into the other end of the tube 8 in concentric relationship thereto. The inner extremity of the upper section of the gear shift lever 10 is spaced from the adjacent extremity of the lower section 5 of the gear shift lever by a washer 11 and the sides of the rod 10 are held from metal to metal contact with the inner periphery of the tube 8 by a sleeve 12. The washer 11 and sleeve 12 comprise sound insulating material such as rubber. In assembling the gear shift lever, the rubber sleeve, which normally has an inner diameter slightly smaller than the inner diameter of the rod 10, is forced into the metal tube 8 and then the rod, which is larger in diameter than the inner diameter of the rubber sleeve, is forced centrally into the rubber sleeve 12, thus placing the rubber under compression and firmly securing the rod 10 against excessive movement relative to the tube 8 and lower section 5.

The swiveled connection between the gear shift lever and the support 2 is partially enclosed by a bell-shaped flared end portion 13 of a tubular shield 14 which is seated upon the outer surface of the metal tube 8. This tube has an aperture 15 for receiving the head 16 of the rivet 9 and it is provided with a restricted upper open end portion which tensionally embraces the upper section of the gear shift lever. The shield 14 is also formed of sound insulating material, such as rubber.

During operation of the transmission, the sound impulses which are created by the transmission gears and other moving parts are arrested by the sound insulating material of the joint between and the upper and lower sections of the gear shift lever and the transmission of such impulses to the body compartment of the vehicle through the support 2 is prevented by sound insulating sheet 3' and flanged bushings 2', the sheet 3' substantially preventing the transmission of sound vibrations through the air in the dome-shaped support. In this manner, the transmission of a material portion of the noise of the transmission through the gear shift lever to the passenger compartment of a vehicle is prevented.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In a transmission having a housing, a support on said housing, a lower gear shift lever section swiveled on said support having an external end protruding from said housing, a tube detachably mounted on said external end, a rod extending into said tube, a sleeve having sound insulating properties separating said rod from the inner walls of said tube, and a tubular shield comprising sound insulating material having a restricted open end tensionally embracing said rod and a flared end partially inclosing the swiveled connection of said support and lower gear shift lever section.

2. In a transmission having a housing, a support on said housing, a lower gear shift lever section swiveled on said support having an external end protruding from said housing, a tube detachably mounted on said external end, a rod extending into said tube, a sleeve having sound insulating properties separating said rod from the inner walls of said tube, a partition comprising material having sound insulating properties between the inner ends of said rod and said lower gear shift lever section respectively, and a tubular shield comprising sound insulating material having a restricted open end tensionally embracing said rod and a flared end partially inclosing the swiveled connection of said support and lower gear shift lever section.

3. In a transmission including a housing having a support, a lower gear shift lever section swiveled on said support, a member mounted on said section having a socket therein, a gasket between said housing and said support having sound insulating properties for preventing the transmission of sound impulses from said transmission housing to said support, an upper gear shift lever section extending into said socket, and a rubber sleeve compressed between said upper section and the walls of said socket for firmly securing said upper and lower sections together and adapted to prevent the transmission of sound impulses from said transmission to said upper gear shift lever section.

4. A transmission including a housing having an opening in one wall thereof, a protruding casing mounted on said housing and registering with said opening, a lower gear shift lever section swiveled in said housing having a rigid tubular member, a sheet-like partition extending across said opening and between said housing and casing comprising sound insulating material and having a slot therein for receiving said lower gear shift lever section, an upper gear shift lever section extending into said tube, a sleeve comprising sound resisting material between said upper section and said tube for preventing the passage of sound impulses from said transmission to said upper gear shift lever section.

5. In a transmission having a housing, a support on said housing, a lower gear shift lever section swiveled on said support having a protruding end, a tube on said protruding end, a rivet securing said tube against displacement, an upper gear shift lever section extending into an end of tube, a rubber element compressed between said upper section and the inner walls of said tube, and a shield on said tube including a tubular member having an aperture for receiving the head of said rivet so as to secure said shield against displacement and a flared end portion partially inclosing the swivel connection between said support and lower gear shift lever section.

6. In a transmission having a housing, a support on said housing, a lower gear shift lever section swiveled on said support including an end portion having a socket therein, a rod extending into said socket, a member having sound insulating properties separating said rod from the inner walls of said socket, and a tubular shield comprising sound insulating material having a restricted open end tensionally embracing said rod and a flared end partially enclosing the swiveled connection of said support and lower gear shift lever section.

CLARENCE R. MILLER.